July 24, 1928.
H. C. HARRISON
1,678,116
DEVICE FOR THE TRANSMISSION OF MECHANICAL VIBRATORY ENERGY
Original Filed Oct. 16, 1923     6 Sheets-Sheet 1
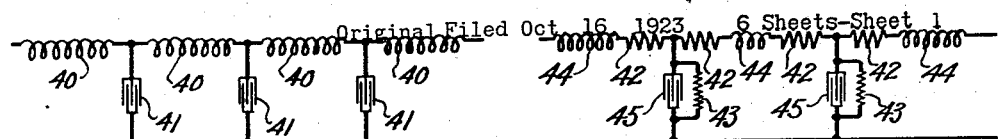
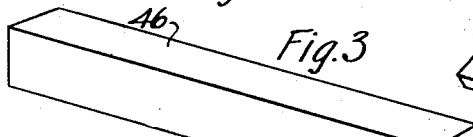
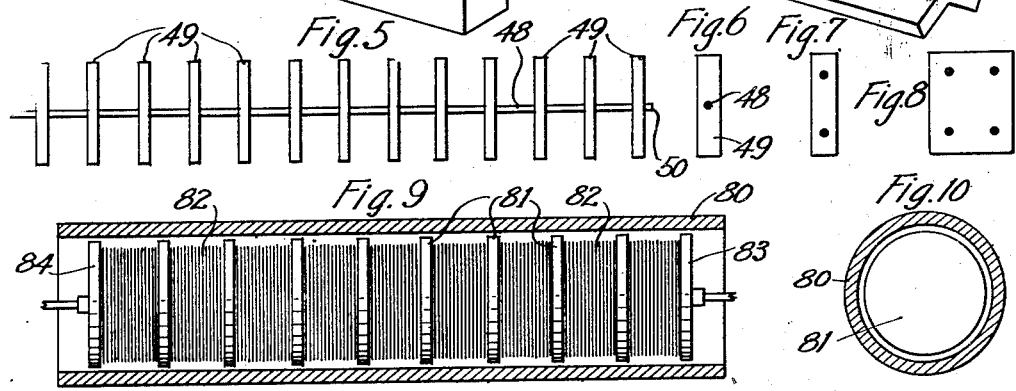
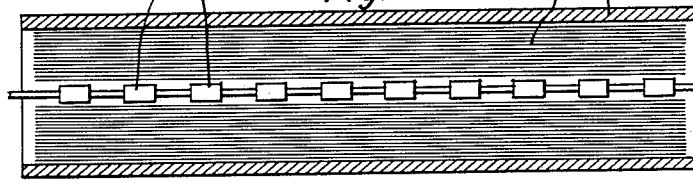 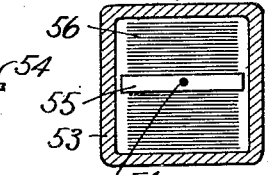
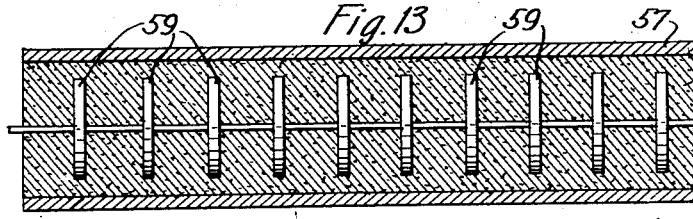 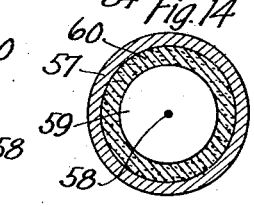
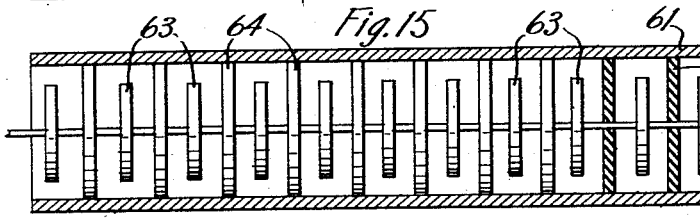 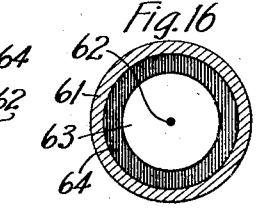
Inventor:
Henry C. Harrison,
by  E.W. Adams  Atty July 24, 1928.
H. C. HARRISON
1,678,116
DEVICE FOR THE TRANSMISSION OF MECHANICAL VIBRATORY ENERGY
Original Filed Oct. 16, 1923   6 Sheets-Sheet 2
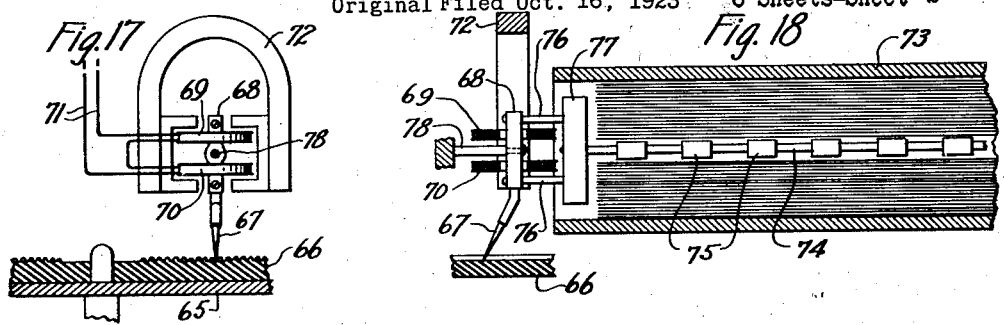
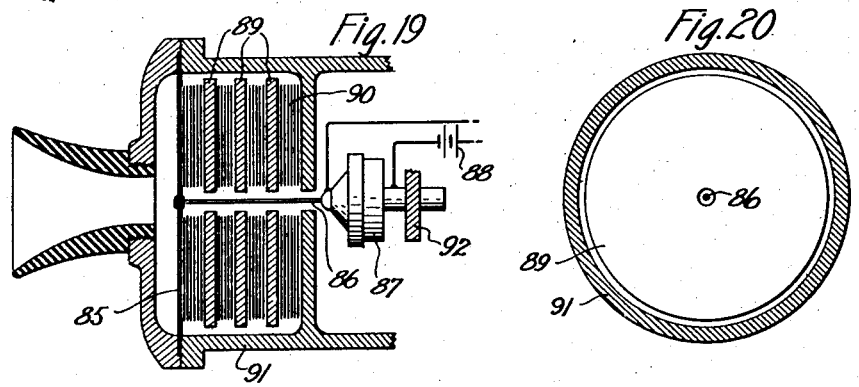
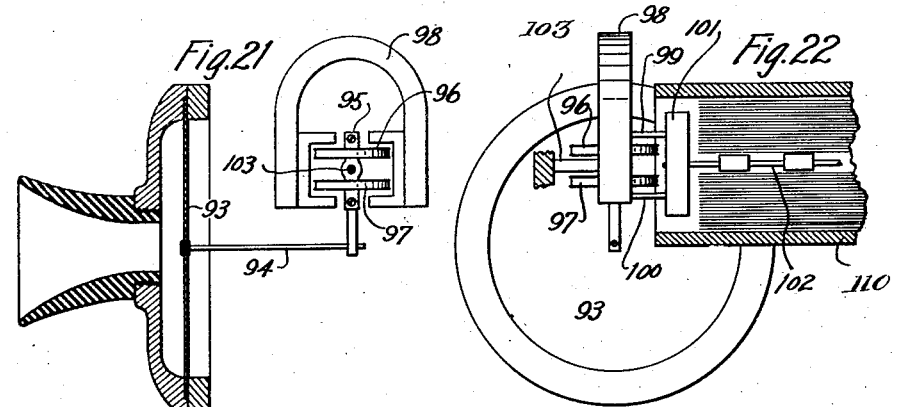
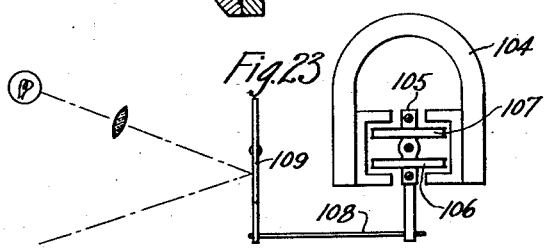
Inventor:
Henry C. Harrison,
by E. W. Adams, Atty

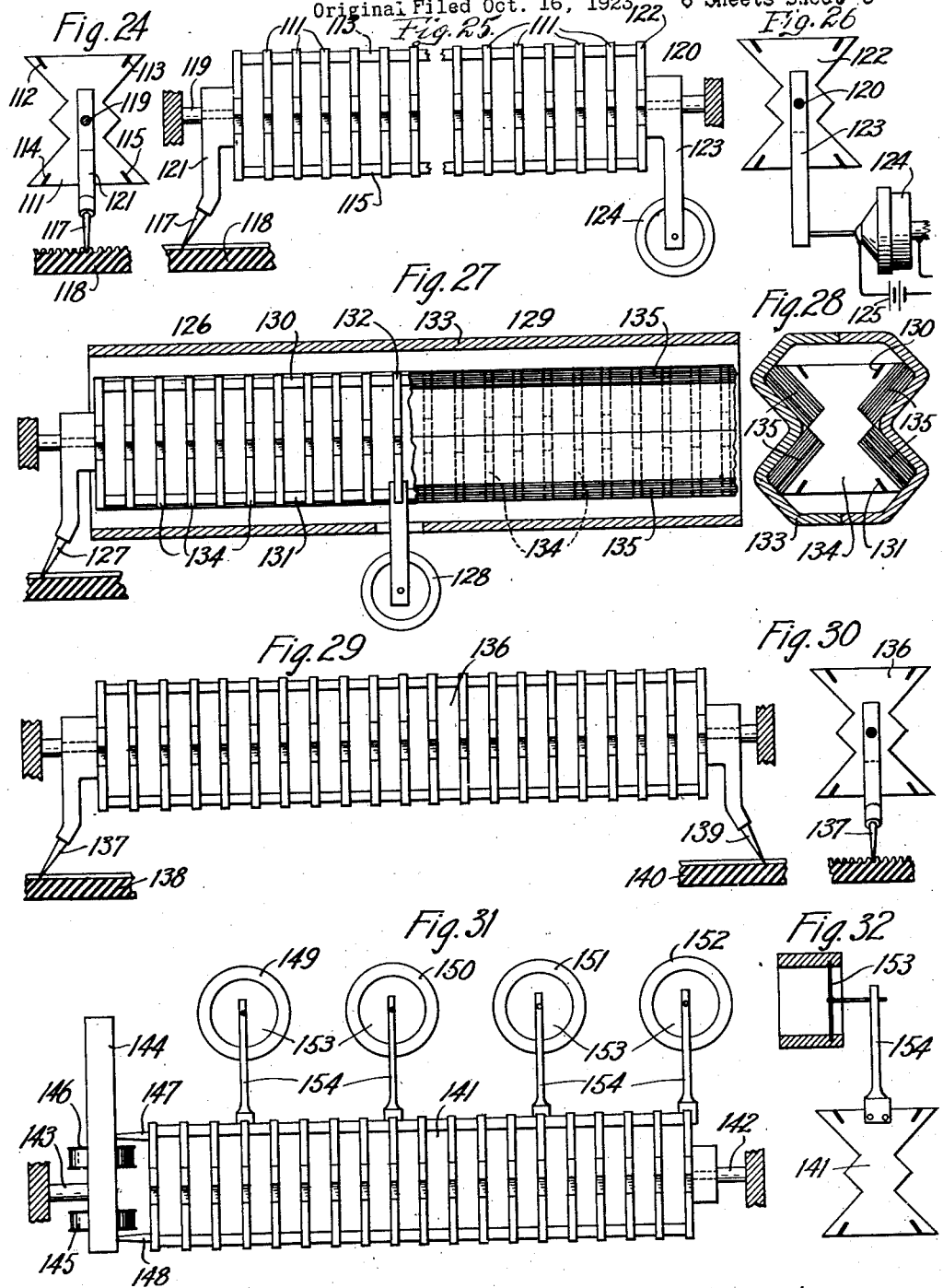

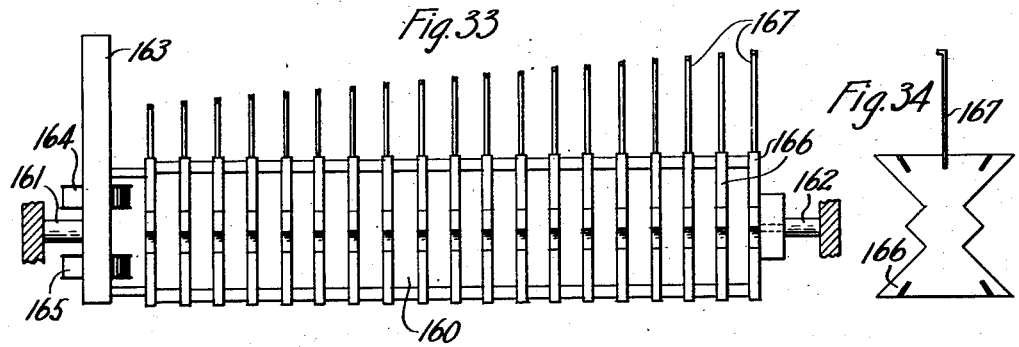
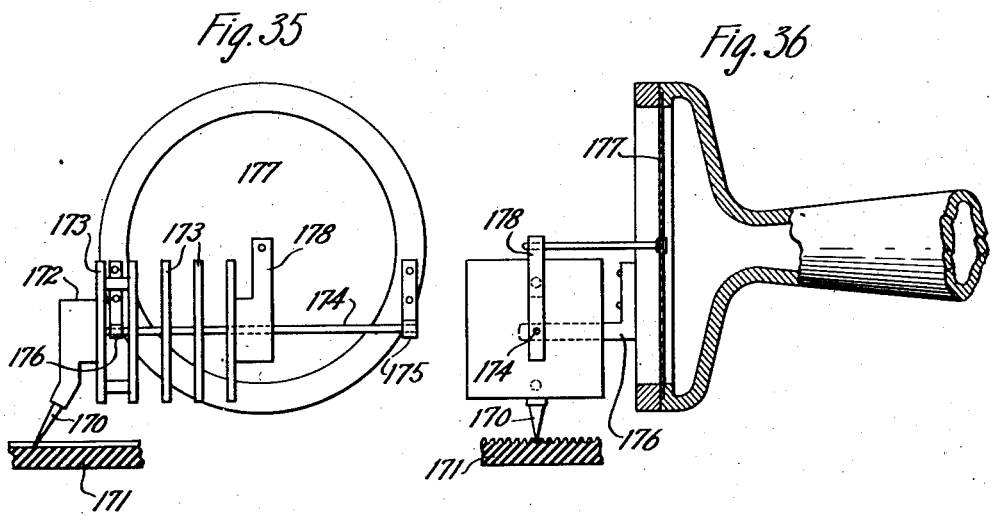
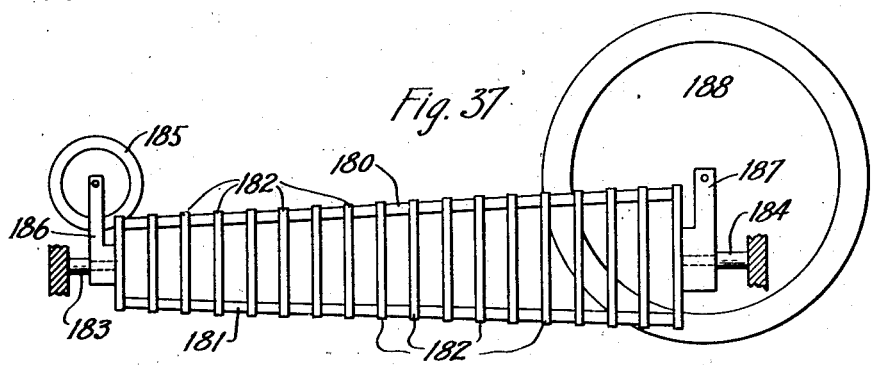

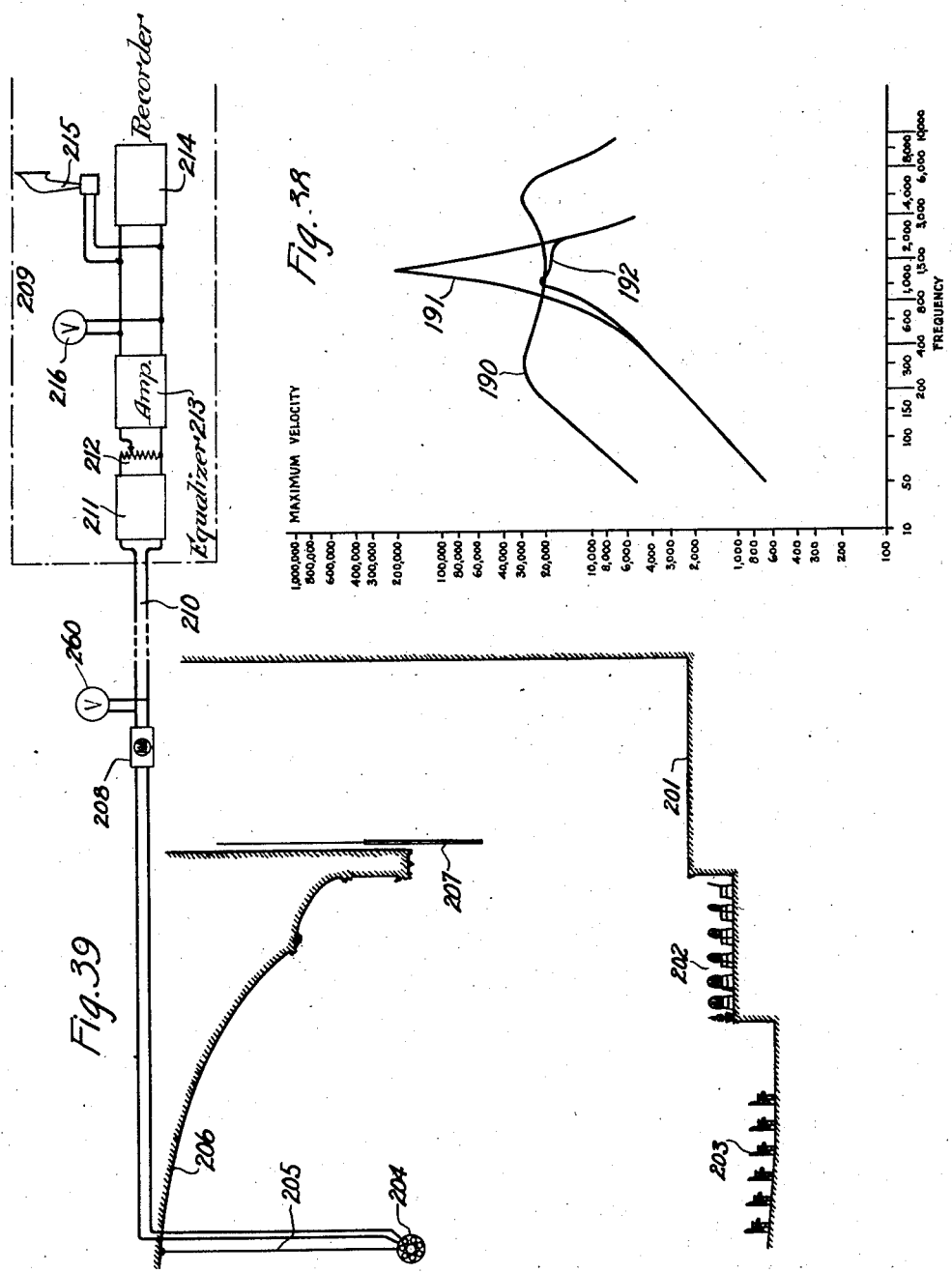

July 24, 1928.
H. C. HARRISON
1,678,116
DEVICE FOR THE TRANSMISSION OF MECHANICAL VIBRATORY ENERGY
Original Filed Oct. 16, 1923    6 Sheets-Sheet 6
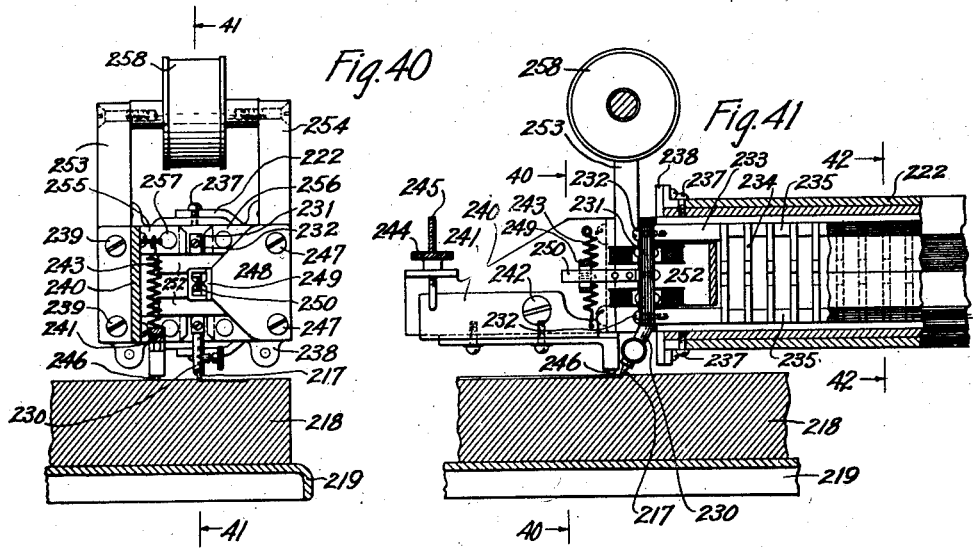
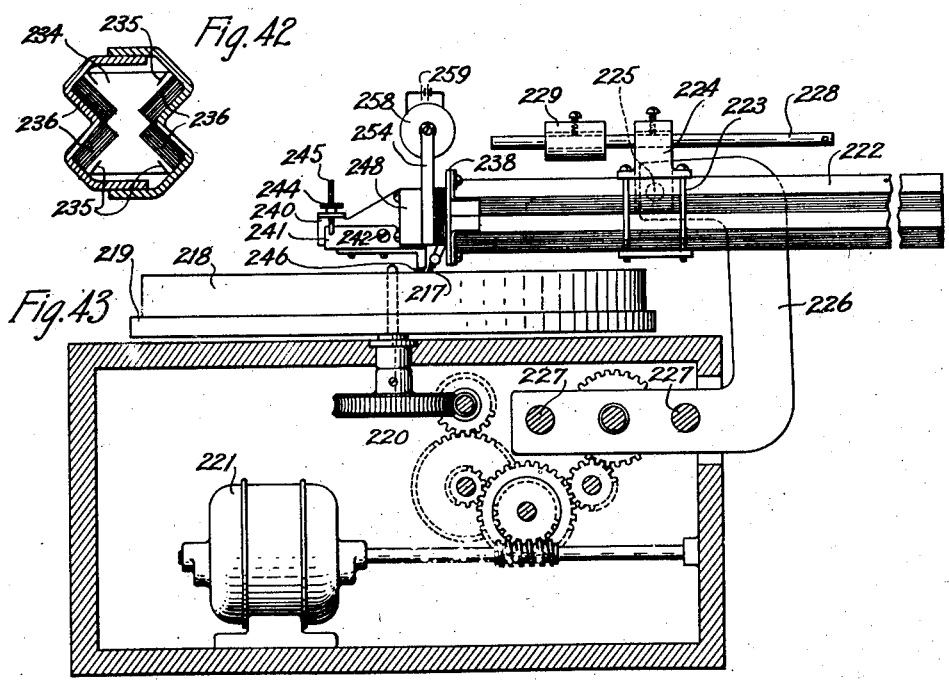
Inventor:
Henry C. Harrison,
by ⟨signature⟩ Atty Patented July 24, 1928.

1,678,116

UNITED STATES PATENT OFFICE.

HENRY C. HARRISON, OF PORT WASHINGTON, NEW YORK, ASSIGNOR TO WESTERN ELECTRIC COMPANY, INCORPORATED, OF NEW YORK, N. Y., A CORPORATION OF NEW YORK.

DEVICE FOR THE TRANSMISSION OF MECHANICAL VIBRATORY ENERGY.

Application filed October 16, 1923, Serial No. 668,801. Renewed October 11, 1927.

This application is a continuation in part of H. C. Harrison application Serial No. 603,005, filed November 24, 1922, wherein is disclosed an invention which relates to mechanical systems for transmitting mechanical vibratory energy, and has for an object to provide in the mechanical field, transmission systems which attenuate or transmit vibratory energy much in the same manner as electric currents are transmitted or attenuated in the electric field by such a system as an electric wave filter, a loaded signaling line, an attenuation equalizer network or a network offering a pure resistance to a band of frequencies.

One aspect of this invention, for example, is the provision of a mechanical device which can be employed to transmit vibratory energy of a plurality of frequencies from one point to another with the same frequency characteristic as is obtained by an electric signaling line which is continuously or lumped loaded according to the Pupin system, for example, to give a uniform transmission characteristic over the band of frequencies it is desired to transmit. This invention may also be applied as a mechanical filter for suppressing undesired frequencies while freely passing the desired frequency band similar to an electric wave filter such as that disclosed and claimed by Campbell in his U. S. Patent No. 1,227,113 of May 22, 1917. It is also capable of being employed as a pure mechanical resistance which responds uniformly to all frequencies, or as a transformer for coupling mechanical devices of unequal impedance.

Another aspect of the present invention relates to the use of transmission systems, such as described above, for phonograph recording purposes. This makes it possible to produce phonograph records the recorded sound of which, for a range of 5000 cycles or more does not appreciably vary from the original sound wave effect. The nearest approach to this, so far as applicant is aware, is the phonograph recording system described and claimed in the copending application of Arnold, Serial No. 664,693, filed September 25, 1923, which has produced records on which the recorded sound, over a range of 2000 cycles, does not appreciably vary from the original sound. The above enumerated applications of this invention are merely illustrative of the ability of this invention to solve many and widely different problems in the field of mechanical vibrating systems.

This invention in one of its aspects comprises a bar or rod which may be of metal provided with such elasticity, mass and mechanical resistance per unit length according to equations hereinafter given as to give the desired frequency transmission characteristic. As a mechanical transmission line the device comprises essentially a plurality of elasticities and masses coupled in series. These masses and elasticities may be uniformly distributed in a strip of elastic material or they may be lumped. In the latter case the mechanical line may comprise a spring rod or bar having a plurality of weights rigidly attached along its length. The mechanical vibrations to be transmitted could then be so impressed on the rod at one end as to subject it to a transverse vibration such as a torsion or twisting motion, which would be transmitted along the rod which is loaded by the attached weights. The resulting motion at the other end of the rod, or at some point along its length may be utilized for any purpose desired, such for example, as moving the phonograph needle for cutting a phonograph record. In employing such a weighted rod as a mechanical resistance, however, it will not always be necessary to impress the motional energy upon one end and to take it off at some remote point since the weighted rod may be attached to the mechanical vibrating system at one end only in order to dampen its vibration. The latter connection is a satisfactory way, for example, for adding the device of this invention to a vibrating system in order to make the mechanical impedance of the total vibrating system match the electrical impedance of electric means associated therewith.

In the solution of problems of mechanical vibrating systems, the mechanical characteristics of a device are analogous to those of an electric system, so that the fundamental mechanical and electrical equations for the propagation and dissipation of energy are identical except for the symbols employed. The inductance L, the capacity C and the resistance R have their respective counterparts in the mechanical field; namely, mass, M, for inductance, the reciprocal of the elasticity, $\frac{1}{S}$, for the capacity and $r$ for the mechanical resistance. As an example of this analogy, suppose it is desired to produce a mechanical filter having a certain cut-off frequency $f_c$ and a characteristic impedance within the transmission band which is substantially independent of frequency. An elastic weighted rod, as above described, is the equivalent of a plurality of sections connected in series, each comprising a series inductance (mass) and a shunt capacity (elasticity), which in the electric art forms a low pass filter with a cut-off frequency.

$$f_c = \frac{1}{\pi\sqrt{LC}},$$

and with a mid series characteristic impedance of $$Z_k = \sqrt{\frac{L}{C}}\sqrt{1-\left(\frac{f}{f_c}\right)^2}$$

and a mid shunt characteristic impedance of $$Z'_k = \frac{\sqrt{\frac{L}{C}}}{\sqrt{1-\left(\frac{f}{f_c}\right)^2}}$$

both of which for all frequencies below the cut-off frequency are substantially equal to $$Z_0 = \sqrt{\frac{L}{C}}$$

which in this application is called the "nominal characteristic impedance". Translating these into mechanical terms, the weighted rod may be given such values that the desired cut-off frequency is attained by $$f_c = \frac{1}{\pi}\sqrt{\frac{S}{M}},$$

where S is the elasticity per section of the material employed and M is the mass per section. Such a device would then have a nominal characteristic impedance of $$Z_0 = \sqrt{MS},$$

which, as will be noted from the equation, is an impedance constant with frequency. Other mechanical equations for determining the particular structure this invention should possess for a particular problem will be hereinafter given.

Referring to the drawings: Fig. 1 represents an electric low pass filter. Fig. 2 is an electric low pass filter of a type comprising resistance in each section for attenuating the transmitted band. Fig. 3 illustrates a metallic bar constructed in accordance with this invention. Fig. 4 is a modification of Fig. 3 of a type which can be subjected only to a twisting motion. Fig. 5 represents a lumped loaded mechanical device of this invention. Fig. 6 is a cross section thereof. Fig. 7 represents a type of this invention in which two rods are employed for connecting the lumped masses. Fig. 8 is a modification of Fig. 6, in which four connecting rods are employed. Fig. 9 is a form of this invention in which the mechanical vibratory energy is impressed on the device by a plunger action. Fig. 10 is a cross section of Fig. 9. Fig. 11 represents a damped mechanical loaded line. Fig. 12 is a cross sectional view of Fig. 11. Fig. 13 represents a mechanical loaded line damped by granular material. Fig. 14 is a cross section of Fig. 13. Fig. 15 represents a mechanical loaded line damped by a plurality of discs of non-metallic material. Fig. 16 is a cross section of Fig. 15. Figs. 17 and 18 represent two views of this invention applied to a phonograph reproducer or recorder. Figs. 19 and 20 illustrate this invention embodied in a telephone transmitter. Figs. 21 and 22 illustrate this invention embodied in a telephone receiver. Fig. 23 illustrates how this invention can be applied to an oscillograph suspension. Figs. 24, 25 and 26 illustrate this invention employed to connect a phonograph needle to an electric carbon button transmitter. Figs. 27 and 28 represent a form of this invention similar to Fig. 25 except that a portion of the mechanical line is damped. Figs. 29 and 30 illustrate the invention for enabling a second sound record to be cut from a record already produced. Figs. 31 and 32 illustrate the invention employed is an electric wave analyzer. Figs. 33 and 34 illustrate another form of electric wave analyzer employing this invention. Figs. 35 and 36 illustrate this invention employed as a filter between the signaling source and loud speaking receiver. Fig. 37 represents this invention employed as a mechanical transformer for coupling devices of different impedances. Fig. 38 is a curve illustrating the transmission characteristic of the device of this invention. Fig. 39 is a schematic representation of an electrical recording system and its relation to the theatre or other public playhouse where the transmitter is located and to the recording room. Fig. 40 is a sectional elevation on line 42—42 of Fig. 41 of a highly damped electrical recorder. Fig. 41 is a sectional elevation on line 3—3 of Fig. 40. Fig. 42 is a sectional elevation on line 4—4 of Fig. 41. Fg. 43 is an elevation of a recording machine which may be employed in connection with the recorder of Figs. 40, 41 and 42.

As is well known in the art, a low pass electric filter usually comprises a plurality of sections, each consisting of a series inductance and a shunt capacity, as illustrated in Fig. 1 by the connections of the series inductances 40 and the shunt capacities 41. Such a filter, as disclosed in the Campbell U. S. Patent No. 1,227,113 of May 22, 1917, may be arranged by equations therein given to provide for the practically free transmission of a given range of frequencies, while almost entirely suppressing frequencies above that range. In case it would be desired to appreciably attenuate the band of frequencies to be transmitted, resistances such as 42 and 43 of Fig. 2 may be inserted in circuit with the inductances 44 and capacities 45, the values determined by the attenuation desired and the frequency characteristics. Fig. 2, of course, may be also regarded as illustrative of a telephone line loaded in accordance with the Pupin system, for example, in which the inductances represent the loading coils inserted at uniform distances along the line, the series resistances representing the resistance of the line per section, and the capacities, the capacity of the line per section, and the shunt resistances representing a leak across the line.

As stated above, this invention provides in a mechanical vibratory system, a device which may be given any frequency transmission characteristic desired of the above described type in order to transmit mechanical vibrations without distortion. Fig. 3 represents a simple form of this invention comprising a long metallic bar 46. This bar may, when subjected, for example, to a twisting motion, be employed in the transmission of vibratory energy from one end to the other with any desired impedance characteristic, depending upon the mass per unit length of the bar and the elasticity of the material employed. Such a bar, with the elasticity S and mass per unit length M, would offer an impedance to the transmission of the twisting motion from one end to another of $$Z_o = \sqrt{MS}.$$

The result is therefore that the bar of Fig. 3 may be chosen of a material having such elasticity and may have such dimensions that it may be employed to advantage in the mechanical transmission of speech frequency vibrations. As noted from the equation above, the impedance that such a bar offers to a twisting motion is then independent of frequency so that the rod may be inserted in a mechanical vibrating system without danger of distortion taking place. The manner in which a rod may be mounted in a mechanical vibrating system as a part thereof will be more readily understood by reference to the following figures and the accompanying detailed descriptions.

Fig. 4 is a modification of Fig. 3, in which the device 47 comprises three strips of metallic material integral with each other and separated from each other by an angle of 120°. Such an arrangement allows the device to be subjected to a torsional movement only, and reduces to a considerable degree the danger of having the device bend due to force exerted at right angles to its axis. With the exception of this protection against bending, the device of Fig. 4 is similar to that of Fig. 3 and may be utilized in the same manner in a mechanical vibrating system.

Figs. 3 and 4 above described correspond in the mechanical field to continuously loaded electric lines since the weight of the bars of Figs. 3 and 4 is uniformly distributed. Fig. 5, however, is the counter part of a lumped loaded electric line since in Fig. 5 the rod 48, which is subjected to the torsion, is of small diameter and negligible weight, and has distributed along its length a plurality of equal masses 49. The rod 48 therefore represents a long electric line and the masses 49 are the points along the line where loading coils are present. For making the electric line of the desired frequency characteristic, the masses 49 may be of any suitable shape, and may, for example, consist of rectangular bars as shown in Fig. 6, which is a cross section of Fig. 5. The operation of a device such as that shown in Fig. 5 will be better understood from the following. Assume that mechanical vibratory energy is impressed on the end 50 of rod 48 in some suitable manner. For example, the masses 49 adjacent the end 50 may comprise the armature of a solenoid connected to an electric line containing signaling currents. The portion of the rod 48 between the first and the second masses will be twisted due to the action of the solenoid, and the magnetic field in which the armature is situated, and the second mass will receive all the vibratory energy except that dissipated due to friction in the portion of the rod between the first and second weights. The vibratory energy in the second mass will be transferred to the third, and so on until the end of the line is reached, each section of the line undergoing a twisting torsion, thereby providing equivalent shunt paths, such as those containing the capacities 41 of Fig. 1. The character of the frequency transmission between the ends of the rod 48 will, as described above, depend upon the elasticity of the rod 48 and the masses 49.

The mechanical lines of Figs. 3, 4 and 5 may be employed for many uses, one of which is as a mechanical resistance for dissipating mechanical energy impressed thereon in such a manner as to subject the bars to a twisting motion. If these mechanical lines are to be employed as mechanical resistances, it will generally be preferable that they be made of considerable length, and in particular the length should be sufficient to substantially dissipate a mechanical wave traveling from one end of the line and back again, but in many cases it is satisfactory to reduce the wave energy by ninety percent in one run to the end of the line and back. This feature of having the line of appreciable length is desirable since if a considerable portion of the transmitted energy is reflected back to the original starting point, the reflected energy would be in phase for certain frequencies of the impressed vibrations and out of phase for other frequencies, so that the mechanical line would have a variable impedance. If the rate of dissipation of the motional energy is small, the line must be long, while for a high rate of dissipation the length can be short. The condition that a line of distributed constants may have a pure resistance surge impedance is $$\frac{r}{S} = g\mathrm{M}$$

where $g$ is the measure of the reciprocal of dissipation in a unit section of the spring rod, and corresponds to the conductance in the electrical case.

Dissipation of the motional energy of the mechanical line may be increased in various ways in order to permit a short line to be employed without danger of a non-uniform frequency impedance characteristic due to the reflection above mentioned. Fig. 11 illustrates a rectangular casing 53 enclosing a spring rod 54, which has distributed uniformly along its length a plurality of equal masses 55. These masses, as shown in Fig. 12, comprise rectangular bars parallel to each other. On each side of the bars are a large number of sheets 56 of damping material such as aluminum foil or paper. When the spring rod 54 is subjected to a twisting motion, the resulting rotation of the weights 55 will be appreciably retarded by the foil sheets and the air enclosed between them, thereby dissipating as heat to a considerable degree the mechanical energy passing along the rod 54. It has been found that aluminum foil is quite satisfactory for this purpose and need be only fairly loosely packed between the casing 53 and the rectangular bars 55 in order to provide such a dissipation of the energy for a line of thirty to forty sections that practically all of the energy impressed on one end of the bar 54 is dissipated before it has gone the full length of the rod and returned again. The dissipation is due principally to the pressure on the sheets causing the air between them to be forced out for each vibration. The casing 53 should therefore be built so as to provide for the ready escape of the air between the sheets.

Figs. 13 and 14 illustrate another way in which the motional energy may be dissipated when the device of this invention is employed as a mechanical resistance. In this particular modification, the casing 57 contains, suitably supported along its axis, a spring rod 58 which is lumped loaded by a plurality of discs 59. The remainder of the casing is substantially filled with a coarse granular material, such as ground cork, aluminum powder or sand 60, which will oppose and dissipate the vibratory energy of the lumped masses 59.

Figs. 15 and 16 represent a third way in which the energy may be dissipated. A casing 61 is disclosed containing in addition to a lumped mechanical line comprising a spring rod 62, and lumped weights 63, a plurality of discs 64 of spongy material, such as rubber. These discs of rubber 64 may, if desired, engage both the spring rod 62 and the inner walls of the casing 61.

The particular manner in which the mechanical line of this invention may be employed as a mechanical resistance is illustrated in Figs. 17 and 18, wherein is disclosed a phonograph recorder or reproducer. 65 is a phonograph turntable on which is mounted a sound record 66. Bearing upon the grooves in the record 66 is the needle 67 of an electric phonograph reproducer, and the needle 67 is attached in the usual manner to an armature 68 surrounded by coils 69 and 70, which have generated therein electric currents corresponding in frequency and amplitude to the mechanical vibrations of the armature 68 produced by the path traveled by the needle 67. The resulting electric currents by leads 71 may be transmitted to any suitable electric translating device, such as a loud speaking receiver, in order to translate the electric currents into sound waces. The phonograph reproducer may employ either a permanent magnet or an electromagnet, and in Fig. 17 a permanent horse shoe magnet 72 is disclosed.

In order that the sound record 66 will be faithfully translated into electric currents corresponding in frequency and amplitude thereto, it is desirable that the mechanical coupling means between the sound record and the solenoid have an impedance which is practically constant over the frequency range involved. As shown in Fig. 18, this desired coupling may be attained by a mechanical resistance of this invention employed as a part of the moving system subjected to the vibrations of the phonograph needle 67. The particular type of mechanical resistance employed is similar to that shown in Fig. 11, and comprises, briefly, a casing 73 containing a spring rod 74, along the length of which are distributed a plurality of masses 75 for loading the rod. The armature 68 of the reproducer is rigidly attached to the spring rod 74 by two pins 76, which connect the armature to a cross piece 77 mounted on one end of the spring rod 74. The spring rod 74 and its weights are supported at one end by the pivoted member 78 for the armature. The other end of the casing 73 (not shown) may be closed in any suitable manner, and for the particular use of the invention in question no pivoting of the rod 74 is required at that end since the mechanical line is herein employed as a mechanical resistance, and no use is made of the motional energy developed at the end of rod 74 remote from armature 68. The casing 73, however, should be independently supported so that the rod 74 is maintained in alignment with the pivoted member 78 and will be readily subjected to a twisting motion due to the passage of needle 67 along the grooves of the sound record.

The impedance presented by the mechanical line employed in Fig. 18 may be varied as desired since, as shown above, its impedance depends upon the elasticity of the rod 74 and the values of the masses 75. Although the rod 74 is shown to comprise only six sections, it is obvious that the rod 74 may be of any length desired since its length will depend upon the character of the damping means employed and the percentage of energy reflected back to the armature 68 for any particular length.

It is obvious, of course, that the system of Figs. 17 and 18 may be employed equally well as a phonograph recorder in which case the plate 66 will be of suitable wax material on which it is desired that the cutting needle 67 be employed for making a sound record thereon. Incoming currents from leads 71 will vibrate armature 68 thereby vibrating the cutting needle 67 and the mechanical line employed in connection with the armature will cause the mechanical vibrations of the needle 67 to correspond faithfully in frequency and amplitude to the incoming currents in line 71. In such a case it is to be noted, the velocity of the armature 68 is an analogy of the current in the first section of the line shown in Fig. 2, since by properly choosing the stiffness, mass, and resistances the impedance of the mechanical line may be made substantially independent of frequency. It is therefore obvious that the current (the velocity of the armature) is a faithful copy of the electromotive force (the electromagnetic force of the armature).

The embodiment of this invention illustrated in Fig. 18 functions due to a twisting action of the spring rod 74 produced by the motion of the armature driven by the needle 67. The mechanical line of this invention, however, is not limited to an arrangement in which the motional energy is one of torsion due to twisting since the energy may be transmitted to the device in other ways. For example, in Fig. 9, a mechanical resistance is disclosed in which the motional energy is impressed upon the device by a plunger action. A casing 80 as disclosed contains a plurality of spaced weights 81, separated from each other by a plurality of thin sheets 82 of material such as aluminum foil or paper. Plunger 83 and 84 serves to close each end of the casing 80 and the movement of the plunger 83 for example, will be transmitted through the air cushioned between the foil sheets and the spaced weights 81 to the plunger 84 at the opposite end. The spaced weights constitute the mass of the mechanical line and the air between the thin air cushioned sheets of foil together with the spring contacts of the sheets presents an elastic reaction, to the motion so that the embodiment of Fig. 9 is the mechanical equivalent of the electric systems of Figs. 1 or 2 depending on the presence or absence of dissipation. The weights 81 represent the loading coils and the elasticity between the air cushioned foil sheets which lie between the weights corresponding to the shunt capacities. The system of Fig. 9 may be employed in a mechanical system with any desired frequency transmission characteristic and may be so constructed with respect to the distributed masses and elasticities as to have a substantially constant impedance for a wide range of frequencies. The chief function of the foil sheets is to provide thin layers of air to give the required elasticity to the system, that is, the elasticity is due to the air between the sheets and not due solely to the sheets. If the sheets fit into the casing tightly so as to substantially prevent the escape of the air there is very little dissipation of energy and the mechanical line is the equivalent of the electric line of Fig. 1. If the sheets fitted loosely in the casing, the mechanical line would be equivalent of Fig. 2 since both elasticity and dissipation would be present.

Figs. 19 and 20 illustrate a specific application of the mechanical device of Fig. 9 and illustrate the device employed in a telephone transmitter. The telephone diaphragm 85 is coupled by a pin 86 to a carbon button 87 whereby, in the manner well known in the art, the vibrations of the diaphragm 85 produced by impressed sound waves will vary the pressure exerted upon the granular material in the chamber 87, thereby varying its resistance to the current flowing therethrough from battery 88. The diaphragm 85, however, in most devices has a rather pronounced resonance whereby certain frequencies tend to be unduly emphasized by the transmitter. In order to give the transmitter an approximately constant frequency transmission characteristic over a wide range of frequencies thereby avoiding the resonance of the diaphragm, a plurality of spaced masses 89 are provided behind the diaphragm spaced from each other and from the diaphragm by sheets 90 of thin material such as metal foil. This causes the diaphragm which is the first section of the mechanical line to work into an impedance which is nearly independent of frequency over any desired range. The weights 89 and the sheets 90 may be disc shaped, for example, with a central aperture to provide for the coupling pin 86. With such a packing arrangement behind the diaphragm the response of the diaphragm will depend upon the masses of the discs 89 and the elasticity of the material employed between discs 89. By suitably adjusting the elasticity and the masses by equations above given the resonance effects of the diaphragm may be substantially overcome so that the transmitter may be employed for faithfully translating into electric waves sound waves which are impressed thereon.

It is obvious, of course, that the mechanical line comprising the weights 89 and the foil sheets 90 may be in as many sections as is desired. The casing 91 enclosing the mechanical line should have such an internal diameter that the weighted discs, and the metal foil sheets will slide readily along the inner walls of the casing in response to the plunger action of the diaphragm 85 and will also allow for the escape of the air between the sheets. The discs 89 in general should have a diameter slightly less than the internal diameter of the casing 91. A suitable supporting member 92 is shown for supporting carbon button 87. The diaphragm 85 may be of any suitable material and either tightly stretched or under very little tension in its position of rest.

It is obvious, of course, that the form of the loaded line disclosed in Fig. 19 may be replaced by other forms of this invention in order to provide a transmitter with a uniform frequency characteristic.

Figs. 21 and 22 illustrate a telephone receiver damped by a mechanical line resistance of this invention. A telephone receiver comprising a diaphragm 93 is disclosed having its center connected by a pin 94 to a pivoted armature 95 surrounded by two small receiver coils 96 and 97. The armature 95 is so placed as to be adapted to vibrate between the poles of a permanent magnet 98. Electric coils 96 and 97 may be connected in series to receive signaling or other alternating currents from a line in order to translate the electric currents into mechanical vibrations of the armature 95 corresponding in frequency and amplitude to the electric currents. The vibration of the armature 95 by the pin member 94 is transmitted to the receiver diaphragm 93 whereby the vibrations of the armature are translated into sound waves. In order that the armature 95 will respond faithfully to the signaling currents impressed upon the receiver coils 96 and 97, the mechanical line resistance of this invention may be employed for insuring that the armature 95 in combination with the receiver diaphragm 93 will have a substantially constant response over a wide frequency range, such as the range of frequency of importance in speech.

Fig. 22 illustrates the manner in which a mechanical line resistance of the type shown in Fig. 11, for example, may be applied for the above purpose. The manner in which the armature 95 is connected to the mechanical line is similar to that shown in Fig. 18 above, since the armature by two coupling pins 99 and 100 is rigidly connected to a member 101 mounted on one end of the spring rod 102. The spring rod 102 as shown in Fig. 11 is provided with a plurality of lumped masses and on either side of the masses are provided a plurality of thin sheets of damping material such as tin foil. The armature is pivoted by a suitable pivot member 103 whereby the armature and the connected spring rod 102 may be vibrated in response to the currents traversing the receiver coils 96 and 97. The end of the casing 110 remote from the armature may be suitably supported in order to allow the rod 102 to be maintained in a parallel position with respect to the pivot member 103. The amount necessary to damp the receiver diaphragm 93 by the mechanical line resistance depends upon various factors, the inherent response peak of diaphragm being a primary factor.

The particular structure illustrated in Fig. 22 is also applicable for damping an oscillograph arrangement in order that the vibrating parts associated with the oscillograph mirror will have a substantially constant response over a wide frequency range.

Fig. 23 illustrates a permanent magnet 104 having a pivoted armature 105 surrounded by two receiver coils 106 and 107, one end of the armature by a pin 108 being coupled to the oscillograph mirror 109 which it is desired to oscillate in accordance with signaling or other alternating currents impressed upon the receiver coils 106 and 107. The manner in which the armature 105 in combination with the mirror 109 may be damped by the mechanical line resistance of this invention will be apparent by reference to Fig. 22 just described which shows an armature connected to a damped line resistance of this invention.

The mechanical line of this invention is not limited in its use to a damping resistance for telephone transmitters, receivers and the like, but is capable of widely different uses. For example, Figs. 24, 25 and 26 illustrate the mechanical line of this invention employed for transmitting mechanical vibrations from one point to another, and the particular application disclosed is one in which one end of a mechanical line is driven by a sound record, while the other end agitates one or more carbon buttons. The form of mechanical line disclosed in these figures comprises a plurality of lumped masses 111 connected by four strips 112, 113, 114, 115 of elastic material. These four strips, as shown in Fig. 24, are placed at the four corners of the rectangle and are so radially and angularly spaced that their projections pass through the center of the masses 111. Each of the weights 111 as shown in Fig. 24 is of an irregular shape such as to allow maximum rigidity against bending in any plane for given overall dimensions, while permitting the spring strips 112 to 115 to be subjected to a twisting vibratory motion. The mechanical transmission line comprising the weights 111 and the spring strips is pivotally supported at both ends by pivot members 119, 120, whereby the spring strips may be subjected to a twisting motion in accordance with a signal to be transmitted. Rigidly fastened to one of the end weights 111 is a member 121 which serves to couple the mechanical line to a phonograph needle 117 resting in the groove of a sound record 118. The resulting vibrations of the needle 117 will therefore be transmitted along the mechanical line in the form of a twisting vibration and the resulting vibration of the end piece 122 by coupling member 123 may be employed to vary the pressure exerted on carbon granular material in a carbon button 124 thereby varying the resistance of the carbon material and the resulting current flowing therethrough due to battery 125. The coupling means disclosed in these figures is one which has no resonance peaks such as are due to mechanical vibrating devices employing stretched diaphragms and the like which tend to respond much more efficiently to certain frequencies than to others. As discussed above the mechanical line shown in Fig. 25 may be made to transmit mechanical vibrations of a wide range of frequency with uniform sensitiveness and will have a cut-off frequency $$f_c = \frac{1}{\pi}\sqrt{\frac{S}{M}}.$$

The propagation constant of such a line is given by equation $$P = \cosh^{-1}\sqrt{1-\left(\frac{f}{f_c}\right)^2}$$

neglecting dissipation

Figs. 27 and 28 show arrangements similar to Fig. 25 except that in addition to employing a mechanical line 126 for coupling the phonograph needle 127 to a carbon button 128 a mechanical damping resistance 129 is added to the structure for increasing to a desired amount the mechanical resistance of the carbon button 126 so as to terminate the vibrating system comprising the needle 127 and the line 126 in an impedance substantially equal to the nominal characteristic impedance of the line. The spring strips 130 and 131, and two others not shown but placed similarly to those of Fig. 24 are continued beyond the lumped mass 132, a desired number of sections and beyond the mass 132 a plurality of thin sheets 135 of material such as metal foil are packed between the lumped masses 134 and the casing 133. These sheets of damping material are provided for dissipating the energy transmitted to the portions of the spring strips extending beyond the point where the carbon button is coupled to the mechanical line, and it is obvious that the amount of packing employed in a particular case will depend upon how rapidly it is desired to dissipate this energy. In constructing such a mechanical line, impedance irregularities should be avoided by having any attachments to a lumped mass included in calculating the weight for the coupling mass so that the total mass including the attachments equals the desired mass per section of the mechanical line. The mass 132 of Fig. 27 should therefore be less than the mass per unit section by an amount dependent upon the mass of the attachment.

Figs. 29 and 30 illustrate another use for the mechanical line 136 wherein one end of a pivoted line is coupled to a phonograph needle 137 which serves to transmit a twisting motion to the pivoted line corresponding to the sound record 138 while at the other end of the mechanical line a cutting needle 139 is made responsive to the transmitted vibratory energy to cut grooves in a blank record plate 140 whereby a sound record will be made thereon corresponding faithfully to the sound record present on plate 138. The spring strips and the lumped masses comprising the mechanical line may be suitably chosen to produce the transmission characteristic desired in accordance with the equations given above.

Figs. 31 and 32 illustrate an application of the mechanical line of Fig. 25 to a harmonic analyzer. A mechanical line 141 of the four-strip type is shown pivoted between two pivot members 142 and 143 for enabling the line to be freely twisted in accordance with the mechanical vibratory energy of the armature of a permanent magnet 144, the armature of which is surrounded by two receiver coils 145 and 146 which may be connected in an electric circuit to receive signaling or other alternating current waves and produce corresponding mechanical vibrations of the armature. The armature (not shown) is coupled by two members 147 and 148 to the end section of the mechanical line 141. At desired points along the mechanical line sound resonating chambers 149, 150, 151, 152 are provided, each having a diaphragm 153 coupled to a lumped load of the mechanical line 141 by connecting members 154. The twisting motion impressed upon the mechanical line by the vibration of the armature will cause the diaphragm 153 to undergo corresponding vibrations and if each of the sound chambers 149 to 152 is of such dimensions as to be resonant to a particular frequency it follows that the intensity of the sound in each of the chambers will be a measure of the intensity of those frequencies in the electric currents impressed upon the receiver coils 145 and 146. It is obvious of course, that any desired number of chambers may be coupled to the mechanical line, each resonating for a particular frequency. The showing of the resonating chambers in Figs. 31 and 32 is not strictly accurate with respect to dimensions since in general their dimensions will be considerably greater than the corresponding dimensions of the mechanical transmission line.

Figs. 33 and 34 show the four-strip mechanical line employed in another type of harmonic analyzer. The mechanical line 160 is shown pivoted at its end by pivot members 161 and 162, one end of the line being connected to the armature of a permanent magnet 163 whereby alternating currents in the coils 164 and 165 serve to impress corresponding mechanical vibrations upon the mechanical line. Each of the lumped masses of the line has rigidly connected thereto a reed 167, each of which is designed to vibrate for one particular mechanical frequency. The vibrations of the reeds 167 will therefore be a measure of the intensity of the respective frequencies present in the complex wave impressed upon the receiver coils 164, 165.

Figs. 35 and 36 illustrate this invention employed as a mechanical low pass filter for filtering out undesired frequencies which would otherwise be transmitted. The phonograph needle 170 operating in the groove of a sound record 171 is by a member 172 coupled to the end section 173 of a mechanical filter comprising a plurality of lumped masses 173 and a spring rod 174. The spring rod 174 is suitably supported for free twisting motion at the points 175, 176. The twisting motion of the spring rod 174 produced by the sound record 171 is transmitted to the diaphragm 177 of a loud speaking receiver by a coupling member 178 connected to the end section of the filter remote from the phonograph needle 170. By equations given above the mechanical filter comprising a spring rod 174 and the lumped masses 173 may be given any desired cut-off frequency such as 3,000 cycles, for example. Below the cut-off frequency the mechanical filter will transmit with practically uniform transmission a wide band of frequencies.

Still another use that can be made of the mechanical line of this invention is that of a mechanical tapered network for matching mechanical impedances that are unequal whereby efficient transmission may be produced, since maximum transmission efficiency is attained when one mechanical impedance works into an equal mechanical impedance. In Fig. 37 a mechanical line is disclosed having spring strips 180, 181 coupled by a plurality of tapered masses 182. The amount the mechanical line is tapered will, of course, depend upon the ratio of impedances to be coupled thereby, the smaller end of the mechanical line being coupled to the smaller impedance, and the larger end being coupled to the larger end of the impedance. The tapered line is shown pivotally supported at two ends by pivot members 183, 184 whereby vibrational energy of the twisting may be freely transmitted by the line. The small end of the mechanical line by member 186 is coupled to a carbon button 185 for varying the pressure on the carbon material contained therein. The larger end of the line by member 187 is coupled to a diaphragm 188 of a transmitter so that the disclosed system provides an arrangement for transferring the mechanical vibrations of the transmitter diaphragm 188 to the carbon button 185 whereby the mechanical vibrations may be efficiently translated into electric currents. In this case motion of the button is made large compared with the motion of the diaphragm thereby giving high button volume.

In designing such a mechanical network the following impedance relation will be found satisfactory, $$\frac{Z_0}{Z_1} = \frac{Z_1}{Z_2} = \frac{Z_2}{Z_3} \cdots = \frac{Z_n-1}{Z_n} = a$$

constants where $Z_0$ is the mechanical impedance of the diaphragm and the attachments thereto, $Z_1$ the impedance of the first section of the mechanical line, $Z_2$ the impedance of the second section, $Z_n-1$ the impedance of the last section, and $Z_n$ the impedance of the carbon button. This arrangement will therefore function as a mechanical transformer for coupling of the two unequal impedances.

As an example of the values a two rod mechanical line such as that shown in Fig. 7 may have, the following is given merely for illustrative purposes. One such mechanical line consisted of thirty-six cross bars of brass, each measuring $\frac{1}{16}$ in. x 1 in. x $\frac{3}{16}$ in., the brass having a density of 8.5. The moment of inertia of these cross bars is .88 g. cm.$^2$ These cross bars were connected by two steel rods, each having a diameter of .009 in., and the cross bars were spaced $\frac{1}{8}$ in. apart. The moment of torsion of these rods was 320 x 10$^6$ cm. dynes per radian. Such a mechanical line had a cut-off frequency of about 6000 cycles and had a substantially constant transmission characteristic for frequencies from 300 cycles up to the region of the cut-off frequency.

For the mechanical line of Fig. 5 using brass weights and steel connecting strips with a cut-off frequency of about 6000 cycles, each strip of steel was .1" by .004" and the moment of inertia about the axis of the line was .9 gm. cm.$^2$ per section. The distance between plates was .125 in.

Referring to Fig. 39 a stage 201 with orchestra pit 202 and seats 203 for the audience are shown. The transmitter 204 is of the type shown in the U. S. patent to Wente No. 1,333,744, March 16, 1920, or in George R. Lum application Serial No. 570,970, filed June 26, 1922 and issued on May 22, 1928 as Pat. No. 1,670,777. The transmitter 204 is located at some distance from the orchestra 202 and stage 201 (in the case of recording music from the orchestra or sounds from artists on the stage) and is illustrated as being suspended by a cord 205 or the like from the ceiling or super-structure 206 of the theatre. In the case of the Capitol Theater, New York city, the transmitter is located 40 feet in front of the stage and 40 feet in the air and in this position it receives substantially the same sound wave effect as is received by the average member of the audience. Furthermore it does not interfere with the public performance by the orchestra 202, or by the artist or artists on the stage 201. Furthermore the transmitter is out of the path of the beam of light projected on the screen 207 from the moving picture machine (not shown). Local to the transmitter 204 is employed an amplifying set 208 of audion type vacuum tubes. If desired an additional transmitter on the stage may be used. Local to the amplifier 208 is a volume indicator such as voltmeter 260 which may be read in adjusting amplifier (by well known means not shown) to give a desired value of voltage impressed on line 210.

The recording room 209 which may be at some distance from the theatre is in electrical communication with the transmitter 204 and the amplifier 208 over the conductors 210. These conductors 210 may be connected to an attenuation equalizer 211 which may be of the form shown and described in Hoyt Patent No. 1,453,980, May 1, 1923. This attenuation equalizer compensates for the distortion of the electric currents due to the impedance of the line 210. The equalizer 211 is connected to an amplifier 213 which is similar to 208 and which is provided with means such as potentiometer 212 for regulating the intensity of the amplified currents. The current from amplifier 213 is supplied to the electrical recorder 214.

A loud speaker 215, located adjacent the recording machine, is supplied with current from the amplifier 213. This loud speaker is adapted to be in operation while the master record is being cut, thus making it possible to monitor the record during its production.

If, by listening to the loud speaker 215 it is perceived that the distortion is so great due, for instance, to noises in the amplifier or in the telephone line, that a satisfactory record cannot be made, the recording may be stopped, thereby saving the trouble and expense of finishing the record. Without the monitoring system, the fact that a record is unsatisfactory cannot be ascertained until the master record is made, plated, and reproduced.

If it is ascertained that the incoming electric currents have an intensity which is either too great or too small, as shown by voltmeter 216 connected across amplifier 213, the potentiometer is manipulated accordingly, while the record is being made. Cutting through from one groove to the next or making the recorded feeble portions so weak that they are lost in surface noise can, therefore, be avoided.

In the case of "acoustical" recording from a full symphony orchestra, the orchestra must play so that the fortissimo is suppressed and the pianissimo amplified in order to drive the stylus within proper bounds. With the present system, such an orchestra may play with natural force and effect, the current from amplifier 213 being kept within proper limits by manipulating potentiometer 212 as suggested by monitoring with loud speaker 215 and voltmeter 216.

Referring to Figs. 40 to 43, the stylus 217 of the recorder is shown in operative relation to a master record 218. The record 218 is supported by a turn table 219 which is driven from motor 221 by suitable means such as a belt or train of gears 220. The recorder shown in Figs. 40 to 43 is provided with a metal casing 222 a section of which is shown in Fig. 42 and which is clamped by means such as bolts 223 to a cradle 224 which is pivoted at 225 to the cross head 226. This cross head is supported and guided by rods 227 and is suitably driven along these rods by the motor 221 and the train of gears connected thereto. The cradle 224 carries a rod 228 which supports a counter balance 229 which may be adjusted to provide a proper pressure of the stylus on record.

The stylus 217 is held in a stylus holder 230 which is suitably fastened to the armature 231 of the recorder. This armature is fastened by screw bolts 232 to the frame work 233 which carries a plurality of spaced plates such as 234 which are interconnected by four spring strips 235. Each of the plates 234 is, therefore, elastically connected by means of the spring strips 235 to the adjacent plates 234. The operation of the stylus causes a rotational movement of the plates 234 which is resisted in part by the spring strips 235 and in part by the tin foil sheets 236 which are loosely packed to provide films of air therebetween and which lie between the edges of the plates 234 and the casing 222.

Suitably fastened to the casing 222, for instance, by screw bolts 237 is the plate 238 which has fastened to one side thereof by screw bolts 239, the supporting arm 240 which carries the advance ball device. This comprises an arm 241 pivoted to arm 240 at the screw 242. The arm 241 is held under tension by spring 243 fastened at one end to the arm 241 at the other end to the arm 240. The thumb screw 244 supported by arm 240 and operating on arm 241 through the bolt 245 is manipulated to adjust the advance ball 246 so that a desired depth of cut shall be obtained.

The plate 238 also has fastened to it by screw bolts 247 a plate 248 of non-magnetic material which carries the supporting or centering device 249 for the extension 250 of the armature 231.

The coils 252 which receive the incoming amplified current are located in a recess in the member 233. The bolts 239 and 247 also serve to hold the magnet poles 253 and 254 as well as the U shaped polar extensions 255 and 256 thereof to the brass plate 238. The U shaped polar extensions 255 and 256 embrace the coils 252 and terminate closely adjacent the armature 231. Each of the four projecting ends from the pole pieces 255 and 256 is fastened by a rivet or screw bolt 257 to the plate 238. The pole pieces 253 and 254 are provided with a magnetic coil 258 which may be supplied with polarizing current from a battery 259 as shown in Fig 43.

The curves in Fig. 38 illustrate the relation between the frequency and the maximum stylus velocity for different phonograph systems. The "frequency" and "maximum velocity" are plotted on logarithmic scales. Curve 190 shows the operation of the phonograph recorder in Fig. 18 or in Figs. 39 to 43. Curve 191 is characteristic of recorders in common use and shows the operation of the recorder in Egerton Patent No. 1,365,898, January 18, 1921. Curve 192 applies to a highly damped recorder.

The data for these curves was taken by impressing on the recorder, currents of various frequencies and constant amplitude. The amplitude of vibration of the stylus, at a particular frequency, was read by means of a microscope. Knowing the amplitude of vibration and the frequency, the maximum velocity for that frequency can be calculated. In the ideal case the maximum velocity of the stylus should be the same at all frequencies, assuming constant current amplitude for those frequencies.

If the velocity efficiency of reproduction at any frequency is not greater than the square root of ten times the efficiency at the frequency at which reproduction is least efficient, persons with normal hearing are not aware of the distortion. A larger distortion is permissible without the music becoming disagreeable.

It will be seen that for curve 191 the range of frequencies in which the response of the peak is not more than the square root of ten times the frequencies of least response is a very narrow one and extends from only about 1040 to 1110 cycles, i. e., a range of about 70 cycles and less than an octave. The quality of transmission of such a system is very poor as compared to that of the present invention.

The curve 192 for the same response range (the peak being not more than the square root of ten times the frequencies of least response) covers a range of from 550 to 2500 cycles, i. e., a range practically of 2000 cycles, or more than two octaves.

Curve 190, for the same response range, covers a frequency range of from about 80 to 8000 cycles, or more than six octaves.

It is to be understood that the slightly wavy character of curve 190 for frequencies above 300 cycles is not a necessary characteristic of the damped resistance of this invention but may be substantially eliminated by careful design of the masses, elasticities, and resistances of the system.

Curve 190 is shown plotted on a logarithmic scale for the reason that along the horizontal axis octaves are represented by equal distances, for example, the distance between 200 cycles and 400 cycles is the same as between 2500 cycles and 5000 cycles, and that is the manner in which the ear "hears", by octaves.

It is to be noted that the uniform response attained with the mechanical line of this invention is produced without a sacrifice in volume, but has its maximum response within the transmission band it is desired to transmit with constant attenuation. This feature therefore sharply distinguishes the mechanical line of this invention from those highly air damped devices wherein good quality is produced at the expense of sensitiveness and wherein uniform response over the speech frequency range is attained by transferring the resonant peak of the device from the essential speech frequency range to a frequency above the essential speech frequencies. Comparing curve 190 with curve 191, the velocity at 100 cycles is about eight times greater and the transmitted energy is therefore 64 times greater with applicant's device than with a resonant diaphragm device characterized by curve 191.

It has been found that the reproducer shown in Figs. 40 to 43 has a response which is substantially constant over a range of from about 80 to 8000 cycles and records produced by the above system using this recorder have given a remarkably good quality. For instance, a piano solo recorded and reproduced in accordance with the present invention gives a sound wave effect unmistakably that of a piano, whereas commercial records of a piano solo made by the "acoustical" method gives a sound wave effect which leaves the average listener in doubt as to whether the record is of a piano or a wood wind. Records of the human voice according to the present invention, give the characteristic tones of the speaker whereby he may be readily identified, whereas this is usually impossible with records made by other systems. With commercial records now on the market, snare drums and low organ notes are not recorded at all, whereas they are with records according to present invention. It is to be noted that at a frequency of 50 cycles, curve 191 shows a velocity of about 600, whereas curve 190 shows a velocity of about 4800, i. e., 8 times higher. The transmitted energy at 50 cycles is, therefore, 64 times higher with applicant's device than with the devices represented by curve 191, which in the region of 50 cycles shows the operation of both the damped and the undamped devices of the prior art.

In further illustrating the advantages of applicant's phonograph device, it has been found that orchestral renditions are reproduced better than previously in the following respect. Prior orchestral records transmit a wide band of high and a wide band of low frequencies so inefficiently that the reproduction has a pinched effect, the instruments having a large amount of either high or low frequencies which sound as though they were distantly located with respect to those pieces which are more efficiently reproduced. Further, so many of the harmonics, which characterize an instrument are lost that it is difficult, if not impossible, with prior records to identify the various orchestral instruments. With applicant's device, however, the transmission is substantially uniform throughout such a wide range that the notes from the various orchestral pieces appear in their proper relative intensities, and the characteristic tones of the various instruments are readily recognized.

The fact that applicant's phonograph device, by reason of the loaded line attachment, weighs many times more than prior devices, has the following advantage. Acoustic shocks, which would jar the stylus of an ordinary device out of the groove, would be absorbed by the inertia of applicant's device, leaving the stylus in the groove. From Fig. 43 it will be seen that the major portion of the loaded line attachment serves as a counter poise for the remainder of the attachment and the phonograph device.

The circuit in Fig. 39 is disclosed and claimed in the copending application of Maxfield, Serial No. 666,148, filed October 2, 1923 and issued on Mar. 6, 1928 as Pat. No. 1,661,539. While it is preferred that the phonograph device herein disclosed be used in the circuit of Fig. 39, it, of course, is adapted to be used in other circuits.

It will be apparent that applicant's invention, when employed as a phonograph recorder, provides records having recorded thereon sounds, the range of frequencies in which the response at the peak is not more than $\sqrt{10}$ times the frequencies of least response, extends from about 80 to 8000 cycles i. e. more than six octaves.

In order to take full advantage of the high quality of these records, they should be used in a system such as provided by applicant's reproducer in combination with an amplifier and a high quality speaker.

It is apparent from the above description that the mechanical line of this invention is of wide application and is not limited to the particular uses illustrated in detail in the drawings. For example, the mechanical line of this invention such as that shown in Fig. 5 may be employed as a time delay relay since a definite time necessarily elapses before an impulse impressed on one end of rod 48 of Fig. 5 reaches the other end. This delay, of course, is capable of being made equal to any time delay desired for any particular service, the time required, of course, being proportional to the length of the line.

The invention claimed is:

1. A mechanical line having precomputed values of elasticity and mass per unit length depending upon the upper limiting frequency of a range of frequencies it is desired to transmit by said line, said values being so proportioned that the vibration of said line is substantially independent of the frequency over a wide band of frequencies below said upper limiting frequency, while said line approximately extinguishes neighboring frequencies lying above said upper limiting frequency.

2. A mechanical link for transmitting vibratory energy having precomputed values of elasticity and mass per section depending upon a frequency near one end of a range of frequencies it is desired to transmit by said link, said values being so proportioned that the vibration of said link is substantially independent of the frequency over said range, while said link approximately extinguishes neighboring frequencies lying above said range.

3. A metallic coupling member for a vibrating system having precomputed values of elasticity, resistance and mass per unit length depending upon the upper limiting frequency of a range of frequencies it is desired to transmit by said member, said values being so proportioned that the vibration of said member is attenuated substantially equally for all frequencies within said range, while said member approximately extinguishes neighboring frequencies above said range.

4. A device for the transmission of mechanical vibratory energy having a length greater than its width and thickness and having such elasticity and mass per unit length that said device has a substantially constant transmission characteristic over a wide range of impressed frequencies.

5. A system for the transmission of mechanical vibratory energy comprising metallic means having a length greater than its combined width and thickness and having such elasticity and mass per unit length that said device has a substantially constant mechanical impedance over a wide range of frequencies, said means being under a negligible tension except when subjected to mechanical vibrations.

6. A mechanical vibratory device subjected to mechanical vibrations impressed thereon at one end, said device having such elasticity, resistance, and mass per unit length that said device has a substantially constant mechanical impedance over a wide frequency range.

7. A device for the transmission of mechanical vibratory energy comprising a metallic bar having such mass and elasticity per unit length that said bar has a substantially constant transmission characteristic over a wide frequency range.

8. A mechanical vibratory device comprising a bar having lumped masses distributed along its length at intervals, depending upon the characteristic impedance desired, said masses having values depending upon the elasticity of said bar.

9. A device subject to mechanical vibrations and comprising a bar having a mass per unit length depending in value upon the elasticity of said bar.

10. A device subject to speech frequency mechanical vibrations comprising a bar having lumped masses distributed along said bar and having values depending upon the elasticity thereof, and means for causing the speech frequencies to subject said bar to a twisting vibration.

11. A signaling device comprising a bar having a mass per unit length depending upon the elasticity of said bar, and means for subjecting said bar to a twisting motion in accordance with a signal.

12. A signaling device comprising a bar having a mass per unit length depending upon the elasticity of said bar, means for subjecting said bar to a twisting motion in accordance with a signal, and means for preventing said bar from bending when subjected to said signal.

13. A signaling device comprising a bar having a mass per unit length depending upon the elasticity of said bar, means for subjecting said bar to torsion in accordance with a signal, and means for adding stiffness to said bar to prevent a bending thereof.

14. A signaling system comprising a device subject to mechanical vibrations in accordance with a signal and comprising a plurality of lumped masses in series connected by an elastic rod, said masses and the elasticity of said rod being such that said device responds substantially uniformly over a wide range of speech frequencies.

15. A signaling system comprising a bar long compared to its width and thickness, a plurality of short bars distributed along said first bar at regular intervals and rigidly fastened thereto, and means for twisting said bar in accordance with a speech frequency signal.

16. A signaling system comprising a bar long compared to its width and thickness, a plurality of short bars distributed along said first bar at regular intervals and rigidly fastened thereto, means for twisting said first bar in accordance with a speech frequency signal, and means for damping the vibratory moton of said short bars.

17. A speech frequency system comprising as one element an electric line and as another element a mechanical vibratory element, means for coupling said elements whereby signaling energy from one of said elements may be translated into signaling energy in the other of said elements, said means comprising a mechanical device having a length greater than its width and thickness and having such elasticity and mass per unit length that said means freely transmits substantially uniformly over a wide freqency range.

18. A speech frequency system comprising as one element, an electric line and as another element a mechanical vibratory element, means for coupling said elements whereby signaling energy from one of said elements may be translated into signaling energy in the other of said elements, said means comprising a long bar having such a mass and elasticity per unit length that said bar freely transmits with substantially a constant transmission a wide range of speech frequencies.

19. A speech frequency system comprising as one element an electric line and as another element a mechanical vibratory element, means for coupling said elements whereby signaling energy from one of said elements may be translated into signaling energy in the other of said elements, said means comprising a spring strip having distributed along its length, a plurality of lumped masses, the elasticity of said strip and the values of said masses being such that said strip transmits a twisting vibratory energy with a practically constant attenuation over a wide frequency range.

20. A speech frequency system comprising as one element an electric line and as another element a mechanical vibratory element, means for coupling said elements whereby signaling energy from one of said elements may be translated into signaling energy in the other of said elements, said means comprising a spring bar having a plurality of lumped masses distributed along its length, means for subjecting said bar to a twisting motion in accordance with a signal, and means for damping the vibratory motion of said bar.

21. A speech frequency system comprising as one element an electric line and as another element a mechanical vibratory element, means for coupling said elements whereby signaling energy from one of said elements may be translated into signaling energy in the other of said elements, said means comprising a spring strip having distributed along its length a plurality of lumped masses, means for subjecting said strip to a twisting motion in accordance with a signal, and means for stiffening said strip against force tending to bend said strip at right angles to its length.

22. A system comprising as one element, an electric line and as another element a mechanical vibratory element, means for coupling said elements to translate signaling energy in one of said elements to signaling energy in the other of said elements, said means comprising a bar connected at one end to one of said elements and connected at a different point to another of said elements, means for causing signaling energy in one of said elements to subject said bar to a twisting vibratory motion, said bar having such elasticity and mass per unit length that signaling energy is transmitted from one of said elements to the other of said elements without substantial distortion.

23. A mechanical line comprising a spring rod having distributed along its length a plurality of lumped masses, pivoting means for said rod to allow said rod to be subjected to a twisting motion, and a phonograph needle coupled to the end of said rod and arranged to twist said rod in accordance with a sound record.

24. A mechanical line comprising a bar, pivoting means for said bar to allow said bar to be subjected to a twisting motion, said bar having such mass and elasticity per unit length that the bar has a substantially constant vibratory response over a wide frequency range, and a phonograph needle arranged to exert a twisting motion upon said bar in accordance with a sound record.

25. A mechanical line comprising a bar having lumper masses distributed along its length, pivoting means for said bar to allow said bar to be subjected to a twisting motion a phonograph needle arranged to twist said bar in accordance with the sound record, and means for damping the twisting motion of said bar.

26. A mechanical line comprising a bar having lumped masses distributed along its length, pivoting means for said bar to allow said bar to be subjected to a twisting motion, a phonograph needle arranged to twist said bar in accordance with a sound record, and means for translating the twist of said bar into electric currents.

27. A mechanical vibrating system comprising a magnet, a pivoted armature between the poles of said magnet, an electric coil surrounding said armature, a phonograph needle holder attached to said armature, a mechanical line attached to said armature comprising a spring bar having a plurality of lumped masses distributed along its length.

28. A mechanical vibrating system comprising a magnet, a pivoted armature between the poles of said magnet, an electric coil surrounding said armature, a phonograph needle holder attached to said armature, a mechanical line attached to said armature and having a length greater than its width or thickness, said line having such a mass and elasticity per unit length that said armature has a substantially constant response over a wide range of speech frequencies.

29. A mechanical vibrating system comprising a magnet, a pivoted armature between the poles of said magnet, an electric coil surrounding said armature, a phonograph needle holder attached to said armature, a mechanical line attached to said armature and comprising a bar having a plurality of lumped masses distributed along its length, a casing surrounding said bar and said masses, and damping material within said casing for damping the twisting motion of said bar, said masses and the elasticity of said bar being of such values that said armature has a substantially constant response over a wide frequency range.

30. A mechanical line comprising a bar having a large number of masses distributed along its length, a source of signals, and means for twisting said bar in accordance with signals from said source.

31. In combination a source of speech frequency signals, and means for translating signals from said source into mechanical vibrations, said means comprising a mechanical transmission line having such elasticity and mass per unit length that signals from said source over a wide frequency band are transmitted with a constant attenuation, the characteristics of said line being arranged to give a greater transmission for frequencies within the transmitted band than for any frequency above said band.

32. In an electrical recording system having a sound responsive element for converting sound waves into electric waves and an electric wave amplifier, a device for translating the amplified electric waves into mechanical vibrations, and means for making the ratio of maximum velocity efficiency of said device to minimum velocity efficiency not greater than the square root of ten over a frequency range of at least three octaves, said means comprising a mechanical line attached to said translating device and having such precomputed values of mass and elasticity as to have a substantially constant impedance throughout said range.

33. A phonograph device comprising a stylus, and means comprising a mechanical line of precomputed values of mass, elasticity and resistance for moving said stylus whereby the range of frequencies in which the response thereof at the peak is not more than the square root of ten times the frequencies of least response extends over at least three octaves.

34. A phonograph device according to claim 33 having such weight as to prevent acoustic shocks from jarring said stylus out of a record groove.

35. A phonograph comprising a supporting structure, a stylus and a mechanical line of series and shunt mass and elastic elements having one end attached to the stylus for damping the motion of said stylus, said line being pivoted to said supporting structure at a point along its length, the portion of said line overhanging said pivot point in one direction serving as a counterpoise for the portion of said line including the stylus overhanging in the other direction.

36. A phonograph device comprising a stylus and a mechanical line having one end attached thereto, said line comprising a plurality of mass elements and elastic elements connecting adjacent mass elements.

37. A phonograph device according to claim 36 in which the values of said mass and elasticity elements are so proportioned that said device responds substantially uniformly to all audible frequencies between 150 and 4000 cycles per second.

38. A phonograph machine comprising a phonograph device, a loaded mechanical line attached thereto to receive vibrations therefrom, and means for supporting said device and line.

39. A phonograph drive, all sections thereof having substantially equal masses and coupled by equal elasticities whereby transition losses are avoided.

40. A mechanical line having a plurality of serially related masses connected by elastic elements, and means for reciprocating said elements in accordance with sound waves.

41. In a device for the transmission of mechanical vibratory energy, a member comprising mass effectively in series and elasticity effectively in shunt to the line of propagation of vibratory energy, the values of said mass and elasticity being such that said member transmits substantially uniformly a wide range of frequencies below a definite limiting frequency equal to $$\frac{1}{\pi}\sqrt{\frac{S}{M}}$$

where M and S represent the values of the mass and the elasticity, respectively.

42. In a device according to claim 41, another member coupled to said first member to receive vibrations therefrom and having an impedance substantially equal to $$\sqrt{MS}$$

over a wide range of frequencies below said limiting frequency.

43. In a device according to claim 41, a plurality of similar members coupled to said first member to receive vibrations therefrom.

44. A device for translating electric wave energy into energy of mechanical motion comprising mass and elastic elements connected partly in shunt and partly in series relation, said elements being so proportioned with respect to one another that said device has a substantially uniform impedance over a wide range of frequencies.

45. A device for interconnecting electrical wave and mechanical motion systems comprising mass and elastic elements connected partly in shunt and partly in series relation to present a substantially constant impedance to mechanical wave motion over a wide range of frequencies below a definite critical frequency.

46. In combination, a magnetic structure, a pivot, a balanced armature rotatably mounted thereon, a mass member mounted on said pivot and attached to said armature, and elastic members controlling said mass member, the elasticity and mass of the elements being so proportioned that they act to transmit with practically uniform small attenuation mechanical waves throughout a wide range of frequencies below a definite critical frequency.

47. In a mechanical vibratory system, means for damping the motion of said system to produce a response substantially independent of frequency over a wide range of frequencies, said means comprising a loaded mechanical line having pre-computed values of mass and elasticity to give said line a substantially constant impedance over said range, and means for dissipating the energy transmitted to said line.

48. In a mechanical vibratory system, damping means according to claim 47 comprising a lump-loaded mechanical line.

49. In a mechanical vibratory system, a device comprising a plurality of sections, each section comprising mass and elastic elements connected partly in shunt and partly in series relation to the line of propagation of vibratory energy, said elements being so proportional with respect to one another that said device has a substantially uniform impedance over a wide range of frequencies.

50. In a mechanical vibratory system, a device comprising a plurality of sections, each section comprising a mass element effectively in series and an elastic element effectively in shunt to the line of propagation of vibratory energy, said device having an impedance substantially equal to $\sqrt{MS}$ over a wide range of frequencies below a definite limiting frequency equal to $\frac{1}{\pi}\sqrt{\frac{S}{M}}$ where M and S represent respectively the values of mass and elasticity per section of said elements.

51. A phonographic device comprising a stylus and a mechanical line attached thereto, said line comprising mass elements effectively in series and elastic elements effectively in shunt to the line of propagation of vibratory energy, said elements being so proportioned as to give said line a substantially uniform impedance over a wide range of frequencies to make the ratio of maximum to minimum response of said device not greater than the square root of ten over a range of frequencies at least as great as the order of three octaves.

52. An electric phonographic device comprising an energy translating device and a mechanical line attached thereto, said line comprising mass and elastic elements partly in series and partly in shunt to the line of propagation of vibratory energy, said elements having precomputed values to give said line a substantially uniform impedance over a wide range of frequency to make the ratio of maximum velocity efficiency to minimum velocity efficiency of said device not greater than the square root of ten over a frequency range of the order of three to five octaves.

53. In a mechanical vibratory system, means for damping the motion of said system comprising a mechanical line of a plurality of sections, each section comprising a mass element and an elastic element, and dissipative means so proportioned with respect to one another as to give said line a substantially constant impedance over a wide range of frequency.

54. A system for the substantially uniform transmission of mechanical vibrational energy over a range of frequencies, comprising a structure having a succession of mechanically coupled sections each of which has both mass and elasticity, said sections having the same cutoff frequency throughout, and the same nominal characteristic impedance taken at the junction points between the successive sections.

55. A vibratory system for the transmission of sound wave energy, said system having its effective elastic reactance substantially equal to its effective mass reactance at all frequencies within the range of the sounds to be transmitted.

56. A vibratory system for the transmission of sound energy, in which the elastic reactance substantially neutralizes the effect of the mass reactance throughout the frequency range to be transmitted.

In witness whereof, I hereunto subscribe my name this 10th day of October A. D., 1923.

HENRY C. HARRISON.